March 20, 1973 V. REDINGER 3,721,275
PROCESS AND APPARATUS FOR MAKING POLYGONAL SPECTACLE GLASS RIMS
Filed April 26, 1971 3 Sheets-Sheet 1

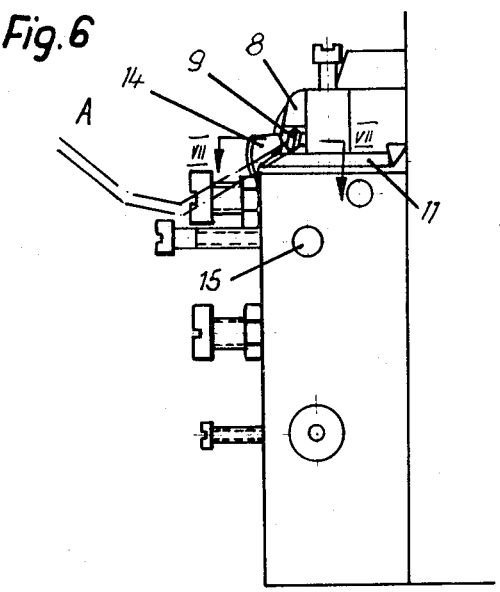
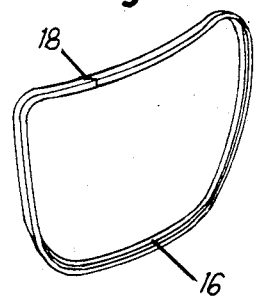
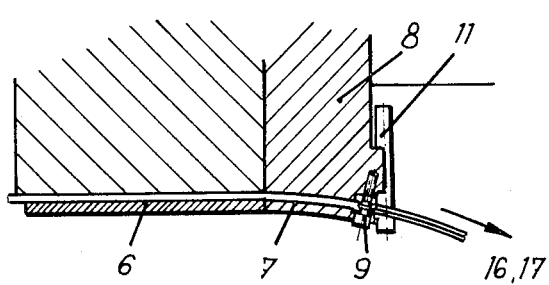
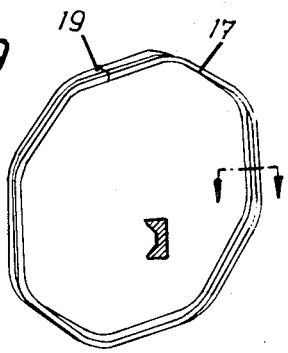

United States Patent Office 3,721,275
Patented Mar. 20, 1973

3,721,275
PROCESS AND APPARATUS FOR MAKING POLYGONAL SPECTACLE GLASS RIMS
Volker Redinger, Pforzheim, Germany, assignor to Robert Hellerich K.G., Eutingen, Baden, Germany
Filed Apr. 26, 1971, Ser. No. 137,482
Claims priority, application Germany, Sept. 12, 1970, P 20 45 240.8
Int. Cl. B21f 37/00
U.S. Cl. 140—88
16 Claims

ABSTRACT OF THE DISCLOSURE

A profiled wire is cut into pieces having a desired length. Each of said pieces is fed through a curved passage having an outlet portion to prebend said piece. Each of said pieces having left said outlet portion is subjected to an automatically controlled, intermittent hammering operation in a direction at an angle to said outlet portion to form predetermined bends in said piece after it has been prebent.

---

This invention relates to a process of manufacturing polygonal spectacle lens rims from profiled wire and to a machine for carrying out the process.

Such polygonal spectacle lens rims, which had, e.g., a rectangular configuration or more than four corners, were previously made from profiled wire in a process in which the wire was cut to length and prebent, whereafter a connector was applied and the rims were closed, then sized by being pulled several times over a shaped disc and subsequently subjected to meniscus bending in a die. That process is time-consuming and requires numerous operations which contribute to the labor costs.

It is an object of the invention to enable a more efficient manufacture because the operations which are required are performed automatically. The process according to the invention is characterized in that pieces of profiled wire cut to a length which is suitable for making respective spectacle glass rims are fed through a curved passage and as they leave said passage are automatically formed with the desired bends by an adjustable hammering operation, which is effected by pneumatic or hydraulic power under control of a control rod which is moved by the feeding and cutting machine. As a result, the preliminary shape can be imparted to the wire in a fully automatic operation and it is then sufficient to bend back the lens rim which has been bent slightly forwardly but has already a shape conforming to a meniscus.

In accordance with the invention, this bending back of the lens rim may also be carried out in a fully automatic operation in that an additional hammering movement at an angle to the first hammering movement is effected at the outlet of the curved passage and during or shortly after the first hammering movement and the additional hammering movement at an angle to the first hammering movement is also effected by pneumatic or hydraulic power under electrical control effected by the control rod for the first hammering operation, preferably by means of cams.

The hammering movements, particularly the first-mentioned bending hammering movement, are preferably accompanied by vibration.

The sequence of operations of the process and further details of the machine according to the invention will now be described with reference to the drawing, in which FIGS. 1 to 3 are a side elevation and top plan view showing diagrammatically the process steps.

FIGS. 4 to 6 are an end view, a top plan view and a side elevation of a tool arrangement according to the invention.

FIG. 7 is a sectional view taken on line VI—VI in FIG. 5 and

FIGS. 8 and 9 are perspective views showing two finished lens rims.

Figure 1:
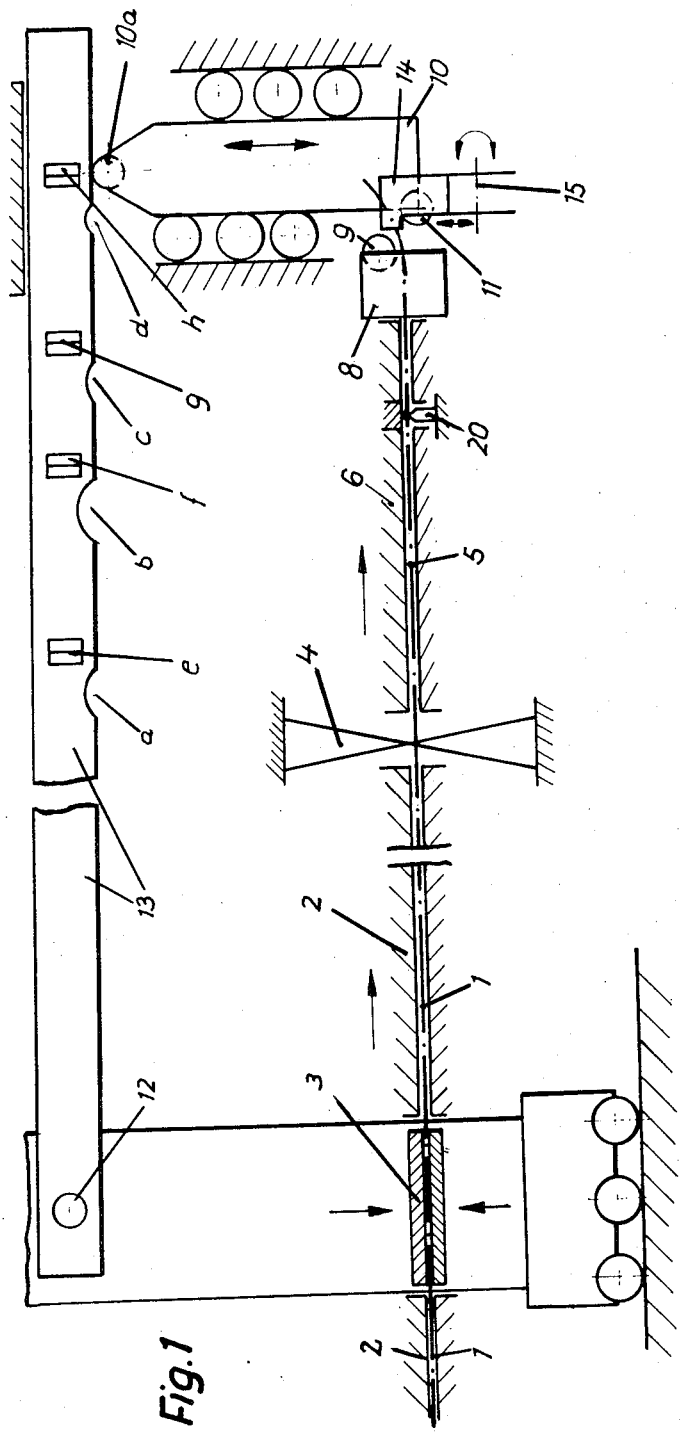
Figure 2:
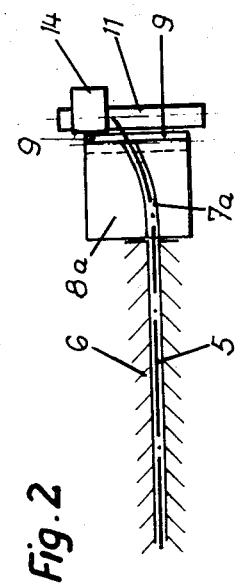
Figure 4:
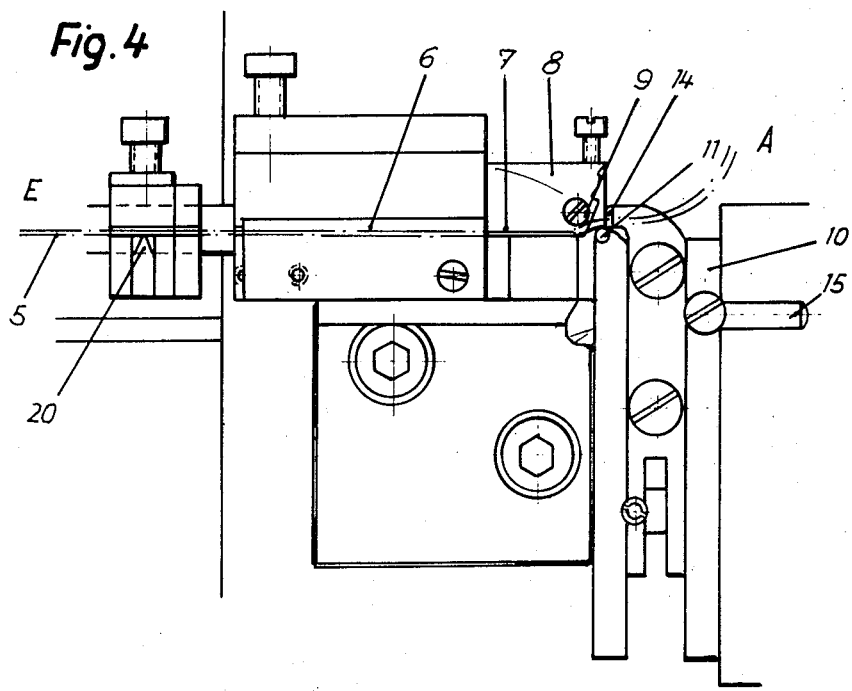
Figure 5:
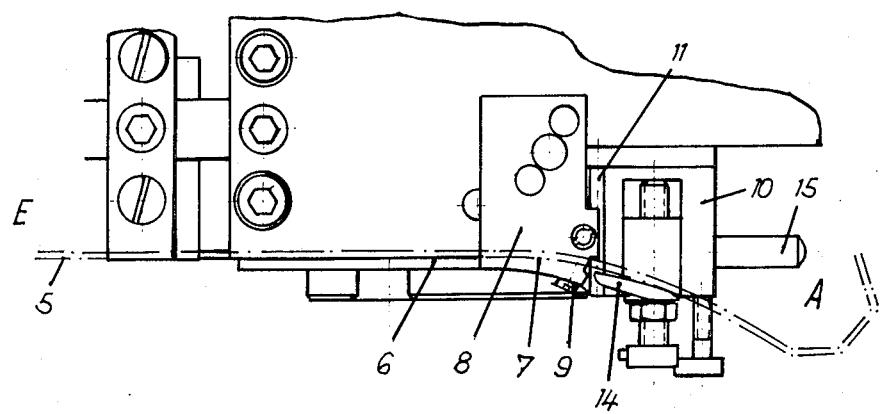

As is apparent from FIGS. 1 and 2, a profiled wire 1 is fed through a guide 2 from the feeding and cutting apparatus by means of gripping jaws to cutter blades 4, which cut the profiled wire 1 into pieces 5 having a preselected length. The feeding and cutting apparatus is preferably operated by pneumatic or hydraulic power. The pieces 5 are then pushed through a guide 6 by the succeeding profiled wire. The guide 6 merges into curved passages 7a and 7b, which are formed in replaceable bending dies 8a and 8b and correspond to the left-hand and right-hand sides, respectively, of the meniscus. A guide roller 9 is mounted on a stationary axis at the outlet of each curved passage 7a or 7b and is succeeded by a roller 11, which extends at right angles to the guide roller 9 and is mounted on a carriage 10 on an axis which is fixed relative to said carriage. A hammering movement may be imparted to the roller 11, e.g., by pneumatic or hydraulic power. In dependence on the feeding of the pieces 5 of profiled wire from the feeding and cutting apparatus, this hammering movement is controlled by a control rod 13, which is pivoted at 12 and engages a roller 10a carried by the carriage 10. The carriage is operated by pneumatic or hydraulic power as it enters the control recesses a to d formed in the rod. There will be four recesses when quadrangular rims are to be made. The number, force, duration and amplitude of the hammering movements are determined by the shape of the recesses and will be selected in accordance with the desired polygonal configuration.

A second hammering movement at an angle to the first is also effected by pneumatic or hydraulic power and electrically controlled by control cams e to h carried by the control rod 13. A hammer lever 14 is provided, which extends at an angle to the hammer roll 11 and can be pneumatically or hydraulically driven under electrical control to perform an additional hammering movement at an angle to the first. Whereas the lens rim has been slightly bent forwardly by the meniscus bending and the subsequent formation of the bends, the rim is bent back into its plane by the second hammering movement.

Figure 3:
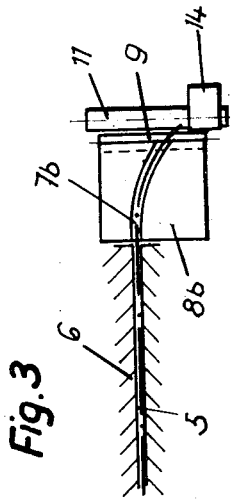

Whereas FIGS. 1 to 3 are schematic, FIGS. 4 to 7 are a more detailed representation of a tool according to the invention. On the side E where the pieces 5 of profiled wire enter, the marking blade 20 is apparent, which is carried by a pivoted lever, which is also pneumatically or hydraulically operated under control of the control rod. The outlet end of the guide 6 is succeeded by the bending die 8, which is formed with the curved pasage 7 and provided with the stationary guide roller 9. This is succeeded by the roller 11, which is mounted on the carriage 10 and fixed thereto and extends at right angles to the roller 9. A hammering movement is imparted to the roller 11 from time to time by pneumatic or hydraulic power under control of the control recesses a to d to form bends or corners in the lens rim which emerges at A after it has been bent into a meniscus shape. A hammer lever 14 is disposed over the roller 11 and extends at right angles thereto and is pivoted on the axis 15. A second hammering movement is imparted to the lever 14 by pneumatic or hydraulic power, which is electrically controlled by means of the control cams e to h. Whereas the lens rim has been bent slightly forwardly by the menicus bending and the first bending hammering operation, the lens rim is bent back into the plane of the lens by the second hammering operation.

The operation of the machine acocrding to the invention results in a lens rim 16 or 17, which has been made from a wire that has been cut to the proper length and has been sized and bent to a meniscus shape. Two such lens rims are indicated at 16 and 17 in FIGS. 8 and 9 of the drawing. When a connector has been applied to such rim at 18 or 19, the same can be incorporated in a spectacle frame. To facilitate this operation, the curved passage 7 may be preceded by marking blades 20, which can also be controlled by the control rod 13 so that the bridge bows etc. can simply be applied to the marked portion.

What is claimed is:

1. A machine for making polygonal spectacle glass rims, which comprises
   means for cutting a profiled wire into pieces having a desired length,
   prebending means formed with a curved passage having an outlet portion,
   feeding means for feeding each of said pieces through said curved passage to prebend said piece,
   a guide roller having a stationary axis and arranged to engage said piece as it emerges from said outlet portion, and
   automatically controlled hammering means for subjecting each of said pieces as it leaves said guide roller to an intermittent hammering operation in a direction at an angle to said outlet portion to form predetermined bends in said piece after it has been prebent.

2. A machine as set forth in claim 1, in which
   said hammering means comprises a carriage, a hammer roller mounted on said carriage and engageable with said piece as it leaves said guide roller, and drive means for imparting a hammering movement to said carriage to perform said intermittent hammering operation.

3. A machine as set forth in claim 2, in which said hammer roller is mounted on an axis which is fixed relative to said carriage.

4. A machine as set forth in claim 2, in which said drive means are fluid-powered.

5. A machine as set forth in claim 2, which comprises a hammer lever extending at an angle to said hammer roller and engageable with said piece when it has left said guide roller, and additional drive means for imparting an additional hammering movement to said hammer lever to subject said piece to an additional hammering operation in a direction at an angle to said intermittent hammering operation.

6. A machine as set forth in claim 5, in which said additional drive means are fluid-powered under electric control.

7. A machine as set forth in claim 5, in which
   said prebending means are detachable for replacement by prebending means having a curved passage which has mirror symmetry to the first-mentioned curved passage and
   said hammer lever is detachable for replacement by a hammer lever which has mirror symmetry to the first-mentioned hammer lever,
   so that the machine may be used to make lens rims for right and left eyes.

8. A machine as set forth in claim 2, which comprises a control rod, which is pivoted to said feeding means and arranged to perform a longitudinal movement in synchronism with said feeding means and to automatically control said drive means in response to said longitudinal movement.

9. A machine as set forth in claim 1, in which said prebending means are detachable for replacement by prebending means having a curved passage which has mirror symmetry to the first-mentioned curved passage so that the machine may be used to make lens rims for right and left eyes.

10. A machine for making polygonal spectacle glass rims, which comprises
    means for cutting a profiled wire into pieces having a desired length,
    prebending means formed with a curved passage having an outlet portion,
    feeding means for feeding each of said pieces through said curved passage to prebend said piece,
    fluid-powered hammering means for subjecting each of said pieces when it has left said outlet portion to an intermittent hammering operation in a direction at an angle to said outlet portion to form predetermined bends in said piece after it has been prebent, and
    a control rod which is connected to said feeding means and arranged to automatically control said hammering means in response to the operation of said feeding means.

11. A machine as set forth in claim 10, in which
    said hammering means comprise a carriage, a hammer roller mounted on said carriage and engageable with said piece when it has left said outlet portion, and drive means for imparting a hammering movement to said carriage to perform said intermittent hammering operation, and
    said drive means are controlled by said control rod.

12. A machine as set forth in claim 11, in which
    said control rod is formed with a plurality of recesses which are spaced apart along said control rod and face said carriage,
    said control rod is pivoted to said feeding means and arranged to perform a longitudinal movement in synchronism with said feeding means,
    said carriage is engageable with said control rod and adapted to enter said recesses, and
    said drive means are arranged to impart said hammering movement to said carriage as it enters one of said recesses.

13. A machine as set forth in claim 10, which comprises
    a hammer lever extending at an angle to said hammer roller and engageable with said piece when it has left said outlet portion, and
    additional drive means for imparting an additional hammer movement to said hammer lever to subject said piece to an additional hammering operation in a direction at an angle to said intermittent hammering operation.

14. A machine as set forth in claim 13, in which
    said control rod carries a plurality of cams, which are spaced apart along said control rod,
    said control rod is arranged to perform a longitudinal movement in synchronism with said feeding means, and
    said additional drive means are controlled by said cams to perform said additional hammering operation.

15. A machine as set forth in claim 10, in which said control rod is pivoted to said feeding means and arranged to perform a longitudinal movement in synchronism with said feeding means.

16. A machine as set forth in claim 10, which comprises marking blades controlled by said control rod to mark said wire before it enters said curved passage.

References Cited
UNITED STATES PATENTS

| | | | |
|---|---|---|---|
| 2,688,346 | 9/1954 | England | 140—71 |
| 3,076,491 | 2/1963 | Bruderlin | 140—71 |
| 2,776,678 | 1/1957 | Savage | 140—71 |

LOWELL A. LARSON, Primary Examiner

U.S. Cl. X.R.

29—20; 140—102